United States Patent
Maurer et al.

(10) Patent No.: US 7,402,189 B2
(45) Date of Patent: *Jul. 22, 2008

(54) AUTONOMOUSLY-CLEANED CONDITIONING SYSTEM

(75) Inventors: Scott M. Maurer, Haymarket, VA (US); Francesco Pellegrino, Cold Spring Harbor, NY (US); Kevin J. Tupper, Huntington, NY (US); Robert D'italia, Melville, NY (US); Thomas J. Psinakis, East Meadow, NY (US); Edward J. Vinciguerra, North Bellmore, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 539 days.

This patent is subject to a terminal disclaimer.

(21) Appl. No.: 11/099,382

(22) Filed: Apr. 5, 2005

(65) Prior Publication Data

US 2006/0207228 A1 Sep. 21, 2006

Related U.S. Application Data

(63) Continuation-in-part of application No. 11/082,721, filed on Mar. 17, 2005.

(51) Int. Cl.
*B01D 46/46* (2006.01)
(52) U.S. Cl. .............................. 55/283; 55/289; 55/301; 55/302; 96/413; 96/420; 96/421

(58) Field of Classification Search ............... 96/413, 96/420–421; 55/283, 301–302; 95/20–23, 95/279–280
See application file for complete search history.

(56) References Cited

U.S. PATENT DOCUMENTS

| | | | | |
|---|---|---|---|---|
| 3,748,906 A * | 7/1973 | Manka | ................... | 73/863.01 |
| 3,766,715 A | 10/1973 | Archer | | |
| 4,500,326 A * | 2/1985 | Sunter | .......................... | 95/20 |
| 5,099,680 A * | 3/1992 | Fournier et al. | ............ | 73/23.31 |
| 6,709,478 B2 * | 3/2004 | Schlaps | ....................... | 55/417 |
| 6,743,282 B2 * | 6/2004 | Najm | .......................... | 96/429 |
| 2006/0207228 A1 | 9/2006 | Maurer et al. | | |

FOREIGN PATENT DOCUMENTS

DE 3336487 4/1985
GB 761999 11/1956

* cited by examiner

*Primary Examiner*—Duane Smith
*Assistant Examiner*—Ives Wu
(74) *Attorney, Agent, or Firm*—DeMont & Breyer LLC

(57) ABSTRACT

An autonomously-cleaned conditioning system conducts a routine purge cycle to clear accumulated particulates from a filter, concentrator, or both. The purge cycle is conducted by reversing air flow through the filter and/or concentrator. Air flow is reversed on a periodic basis or on the occurrence of a condition, such as a reduction in air flow exiting the concentrator.

13 Claims, 5 Drawing Sheets

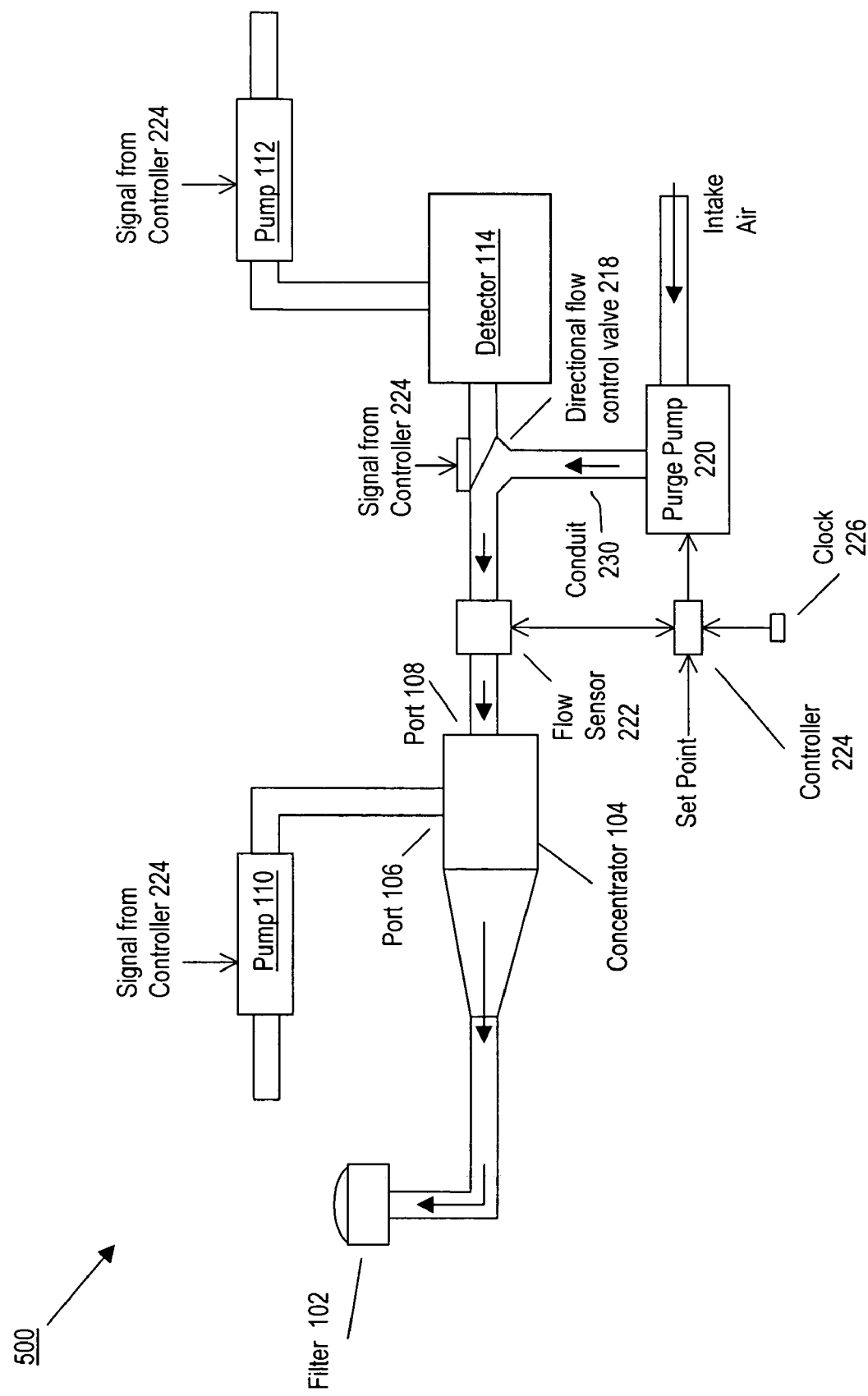

AUTONOMOUSLY-CLEANED CONDITIONING SYSTEM

STATEMENT OF RELATED CASES

This case is a continuation-in-part of U.S. patent application Ser. No. 11/082,721 filed Mar. 17, 2005.

FIELD OF THE INVENTION

The present invention relates generally to systems that include filters and/or concentrators for conditioning gas flow to sampling, analysis, or detection systems.

BACKGROUND OF THE INVENTION

A filter, a concentrator, or both, is often used in conjunction with sampling, analysis, and detection devices. The filter is used to prevent certain particulates (e.g., those out of a size range of interest, those likely to cause mechanical problems, etc.) from reaching analysis or detection equipment. The concentrator is used to increase the concentration of particles in a volume of gas (e.g., air, etc.).

FIG. 1 depicts conventional conditioning system 100 being used in conjunction with detector 114. In this example, the purpose of detector 114 is to monitor the air for particles within a certain size range, such as between 1 to 10 microns. The function of conditioning system 100 is to deliver particles within the size range of interest, and at a concentrated level, to detector 114 and to prevent particles that are larger than the size range of interest from reaching concentrator 104 or detector 114. The air-flow through system 100 is depicted by the arrows.

Conditioning system 100 includes filter 102, concentrator 104, and pumps 110 and 112. Filter 102 traps relatively large particles (i.e., greater than about 15 microns in this example) to prevent them from reaching concentrator 104 and/or detector 114. Pumps 110 and 112 are used for drawing air through filter 102, concentrator 104, and detector 112. In particular, for the system depicted in FIG. 1, pump 110 is used to draw air through port 106 and pump 112 is used to draw air through port 108 toward detector 114. Particles that are smaller than the size range of interest are drawn through port 106. Particles within the size range of interest are drawn through port 108.

Filter 102 and concentrator 104 typically include surfaces that tend to clog, especially when the filter or concentrator are used in dirty environments, such as underground passages or tunnels, etc. Frequent maintenance is therefore required to maintain the performance of these conditioning-system elements. This drives up the operational cost of devices that use a conditioning system, such as detector 114.

This problem of clogging has been addressed in the prior art by using replaceable mesh-filtration systems. But these filters must be replaced when they clog, which occurs frequently in dirty environments.

As a consequence, there is a need for device or system for addressing the clogging problem in filters and concentrators.

SUMMARY OF THE INVENTION

The present invention provides a way to autonomously clean a conditioning system (i.e., a filter, a concentrator, or both, as well as associated conduits and pumps) and avoid the frequent and costly maintenance intervals that are typical of this system.

The illustrative embodiment of the present invention is an autonomously-cleaned conditioning system. The system autonomously-cleans the filter, concentrator, or both (the term "conditioning elements" is also used to refer to a filter, a concentrator, or both) via a routine purge cycle. The purge cycle is conducted by reversing the gas flow through the conditioning elements. This has been found to be effective for removing particulates that have accumulated on surfaces in and around the conditioning elements. The removed particulates can be exhausted, directed to a trap, or collected for later examination. Gas flow is reversed on a periodic basis (e.g., hourly, etc.) or on the occurrence of a condition (e.g., reduced gas flow in the forward direction through the condition elements, etc.), or both.

In some embodiments, the autonomously-cleaned conditioning system comprises a purge system and a control system, in addition to the elements normally present in a prior-art conditioning system (i.e., a filter, concentrator, or both, and one or two pumps). The control system comprises at least one multi-way control valve and control elements (e.g., a controller, etc.) for controlling the multi-way control valve. In some embodiments, the purge system comprises a purge pump. In some other embodiments, the autonomously-cleaned conditioning system does not require a separate purge pump. Rather, the one or more pumps that are normally used in conditioning systems are appropriately piped and valved to enable the gas flow to be reversed without using an additional pump. In other words, the standard pumps become part of the purge system.

A variety of different designs are known and used in the art for filters and concentrators. But all such conditioning elements include surfaces that tend to accumulate particulates. As a consequence, any standard conditioning elements can be reconfigured as an autonomously-cleaned conditioning system in accordance with the present teachings.

BRIEF DESCRIPTION OF THE FIGURES

FIG. 5 depicts a second variation of the illustrative embodiment.

DETAILED DESCRIPTION

The following terms are defined below for use in this specification, including the appended claims:

The term "upstream" refers to the location of an element in a system relative to another element of the system vis-à-vis the flow of a fluid through the system during normal operation. In other words, a first element that is said to be "upstream" of a second element means that a fluid, etc., flowing through the system during normal operation, will encounter the first element before it encounters the second element.

The term "downstream" is the converse of upstream. That is, a second element that is said to be "downstream" of a first element means that fluid, etc., flowing through the system during normal operation, will encounter the second element after it encounters the first element.

The phrase "fluidically coupled," when used to describe a relationship between two regions or elements, means that fluid can flow from one of the regions or elements to the other. The flow from one element to another can be through other elements; in other words, two regions or elements that are fluidically coupled are not necessarily physically connected to one another.

Figure 2:
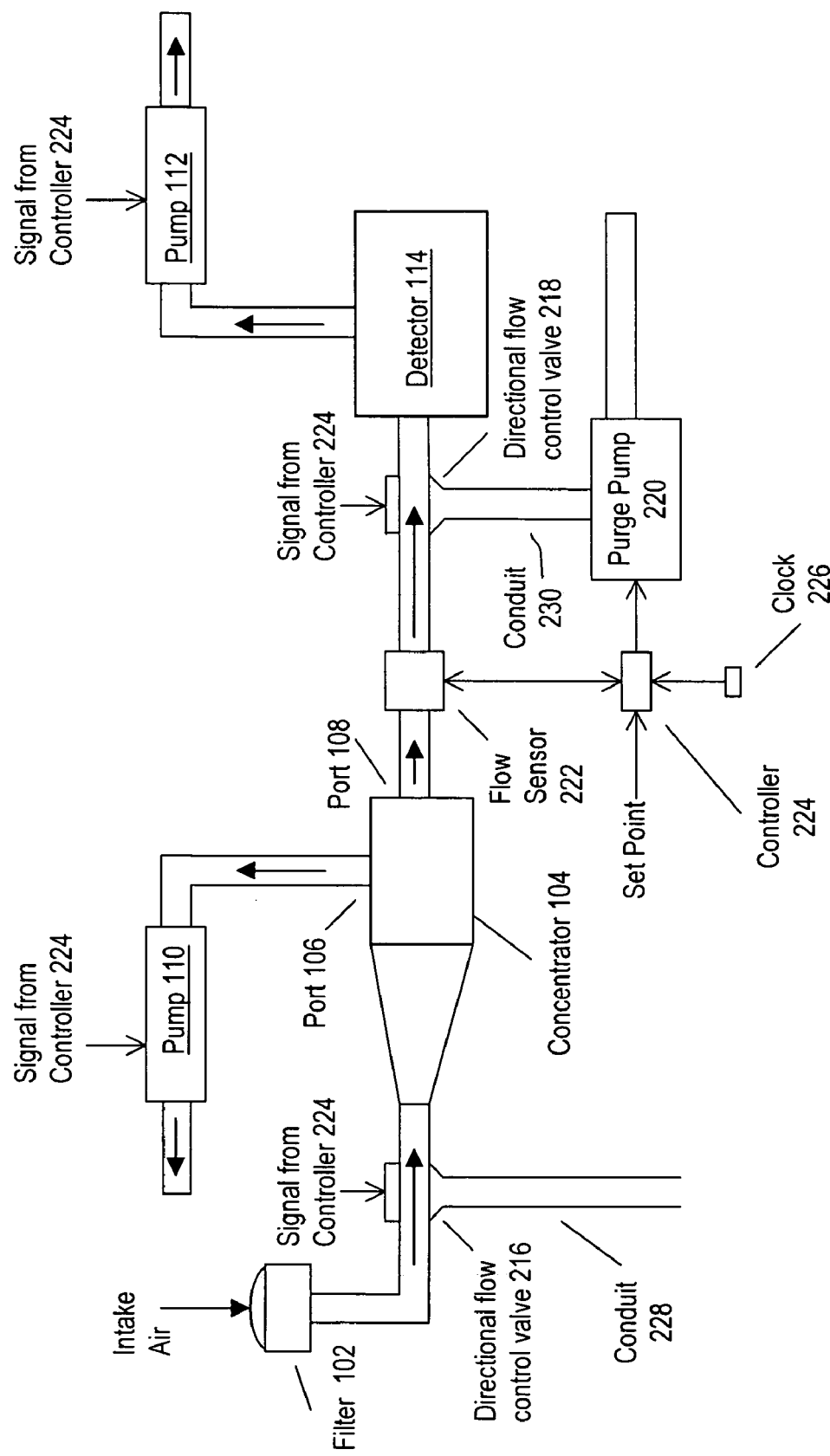
FIG. 2 depicts an autonomously-cleaned conditioning system in accordance with the illustrative embodiment of the present invention, wherein the system is depicted in a particle detection (i.e., normal operating) mode.

FIG. 2 depicts autonomously-cleaned conditioning system 200 in accordance with the illustrative embodiment of the present invention. This system can be used in conjunction with a variety of different types of devices and systems including, without limitation, sampling, analysis, and detection devices.

Autonomously-cleaned conditioning system 200 includes elements of a standard conditioning system, as well as a purge system, and a control system. In the illustrative embodiment, the elements of a standard system include filter 102, concentrator 104, and pumps 110 and 112. The purge system comprises purge pump 220. And the control system includes upstream flow control valve 216, downstream flow control valve 218, flow sensor 222, controller 224, and clock 226.

Figure 1:
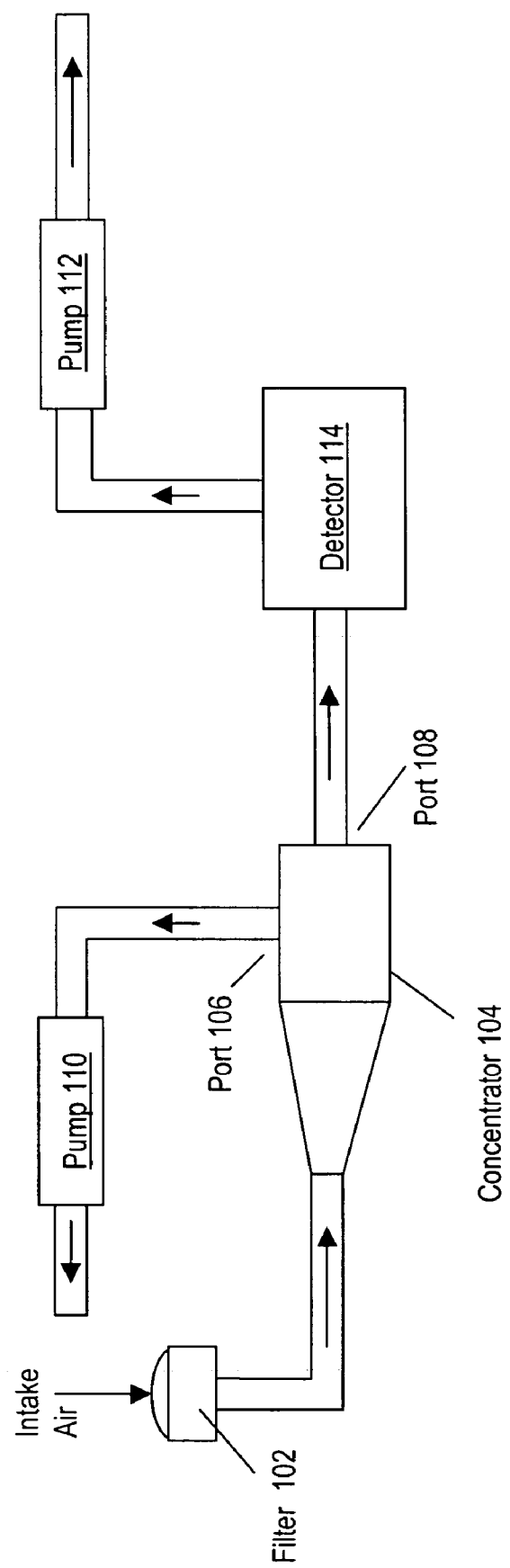
FIG. 1 depicts a conventional conditioning system for use with a detector.

FIG. 2 depicts system 200 during particle detection (i.e., normal operation). In this mode, air is drawn through system 200 toward detector 114 along substantially the same path as for conventional conditioning system 100 (depicted in FIG. 1).

In particular, air is drawn through filter 102, which traps relatively large particles (e.g., greater than 15 microns, etc.) to prevent them from reaching concentrator 104 and detector 114. Responsive to a signal from controller 224, upstream control valve 216 is configured to pass air flow toward concentrator 104. In this state, upstream control valve 216 prevents air from flowing to conduit 228. Likewise, responsive to a signal from controller 224, downstream control valve 218 is configured to pass air flow toward detector 114. In this state, control valve 218 prevents air from flowing to conduit 230. For normal operation (forward flow), autonomously-cleaned conditioning system 200 operates at an inlet pressure of about 2 psig, but can vary upward or downward based on the system design, and variations in system flow rate, filter and orifice resistances, etc.

Figure 3:
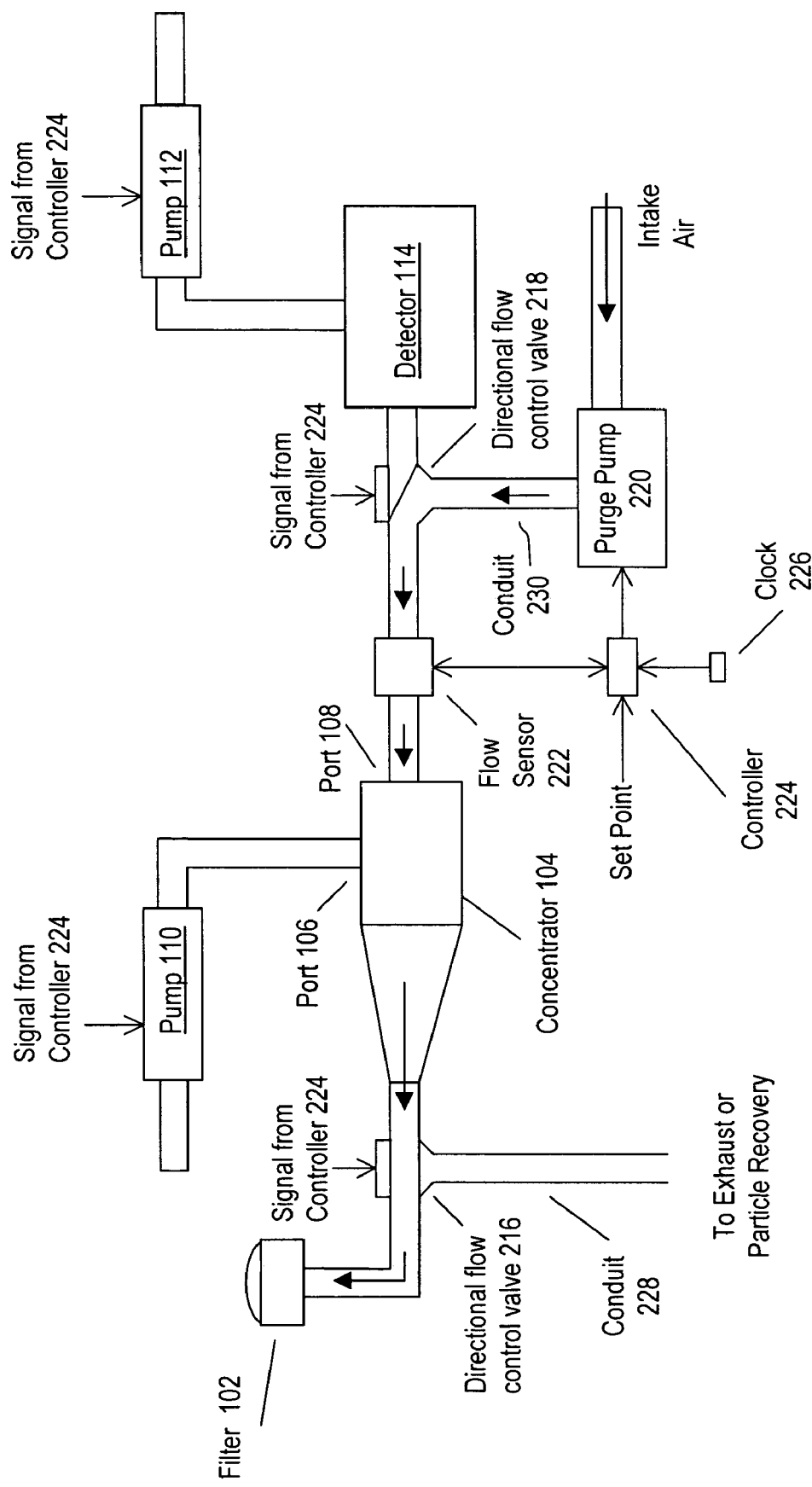
FIG. 3 depicts the autonomously-cleaned conditioning system of FIG. 2, wherein the system is depicted in a cleaning or purge mode.

In accordance with the illustrative embodiment, and as depicted in FIG. 3, autonomously-cleaned conditioning system 200 is automatically subjected to a purge cycle. During the purge cycle, air flows in a reverse direction through at least one of conditioning elements 104 and 102. During the purge cycle, the pressure at the outlet of concentrator 104 (which is the "inlet" during the purge cycle) is about 20-35 psig, as a function of system design. The reverse flow of pressurized air dislodges clogged particulates and routes them to one of several locations, as described further later in this specification.

In the illustrative embodiment, the purge cycle can be initiated in either one of two ways. In particular, any given purge cycle is initiated periodically (i.e., on a timed basis) or based on a change in an operating parameter of autonomously-cleaned conditioning system 200.

As to the former method, controller 224 periodically initiates a purge cycle in conjunction with clock 226. For example, in some embodiments, a purge cycle is scheduled and implemented on an hourly basis. The periodicity of the purge cycle is a function of the environment in which autonomously-cleaned conditioning system 200 operates. For example, one way in which to set the cycle time is to perform a field trial to determine how quickly particulates accumulate within conditioning elements 102/104. Based on the trial, the cycle time is set to keep the condition elements free of accumulated particulates. Alternatively, the cycle time might be based on the average time that it takes for air flow to drop to some fraction (e.g., 90 percent, etc.) of its initial rate through clean conditioning elements 102/104. Those skilled in the art, after reading the present disclosure, will be able to set a desired cycle time in conjunction with field testing or other experimentation.

Notwithstanding the efficacy of field testing to determine a cycle time, any number of upset or seasonal conditions might cause conditioning elements 102/104 to clog at an unexpectedly accelerated rate. For example, if construction is taking place in the area in which autonomously-cleaned conditioning system 200 is operating, it is likely that additional particulates will be present in the air. Furthermore, during spring and summer, the pollen count will increase the level of particulates in the air. As a consequence, initiating the purge cycle at a specific time interval might prove to be ineffective for reliably preventing clogs in the conditioning elements.

Therefore, and in accordance with the illustrative embodiment, autonomously-controlled conditioning system 200 also includes a sensor, wherein the sensor is capable of initiating the purge cycle when it senses a change in a monitored operating parameter, such as, for example:

the rate of air flow leaving filter 102, concentrator 104, or both individually or collectively; or the pressure drop across filter 102, concentrator 104, or both individually or collectively.

In the illustrative embodiment, the air flow rate leaving concentrator 104 is monitored by flow sensor 222. This flow sensor is capable of generating a signal that is indicative of the air-flow rate immediately downstream of concentrator 104. The signal that is generated by flow sensor 222 is transmitted to controller 224. The controller compares the signal to a set-point signal that is representative of, for example, a minimum acceptable air flow rate. If the air flow rate drops below the set-point, controller 224 generates and transmits signals, as appropriate, to initiate the purge cycle.

Accordingly, based on either: (1) time or (2) a change in an operating parameter, as described above, controller 224 generates and sends a signal to pumps 110 and 112 to shut down. Also, controller 224 transmits a signal to control valve 218. When it receives the signal that indicates that the purge cycle is to begin, control valve 218 changes state so that flow from conduit 230 toward air concentrator 104 is allowed while flow toward detector 114 is blocked.

Furthermore, controller 224 transmits a signal to purge pump 220, which causes the purge pump to actuate. The purge pump then draws intake air and pumps it into conduit 230. The pressurized purge-air passes through control valve 218 toward concentrator 104 and, in some embodiments, filter 102. Accumulated particulates are dislodged and picked up by the purge-air. The particulate-laden purge-air flows through control valve 216 to one of two destinations based on the state of control valve 216.

In the illustrative embodiment, control valve 216 blocks the flow of purge air toward conduit 228 and enables the flow of purge-air to filter 102 and then to a recovery system. In some other embodiments (not depicted), control valve 216 blocks the flow of purge air to filter 102 and enables the flow of purge air to conduit 228 and then to a recovery system.

The purge cycle is continued for a predetermined period of time and then stopped. Controller 224 then transmits signals to the various control valves and pumps, as appropriate, to ready autonomously-cleaned conditioning system 200 for normal operation.

In the illustrative embodiment, autonomously-controlled conditioning system 200 includes appropriate elements and is suitably programmed to initiate the purge cycle based on both time and a decrease in air-flow, whichever dictates. In some alternative embodiments of autonomously-controlled conditioning system 200, the purge cycle is initiated only a time basis. And in yet some further alternative embodiments of autonomously-controlled conditioning system 200, the purge cycle is initiated only on the occurrence of a changed operating parameter. These alternative embodiments might be selected in preference to the illustrative embodiment when, for example, a simpler system is desired or otherwise necessary.

While in the illustrative embodiment, flow sensor 222 is located downstream of concentrator 104 to monitor the flow from this element, in some other embodiments, flow sensor 222 is located directly downstream of filter 102 to monitor the flow out of the filter. And, in some additional embodiments, flow sensors are located in both locations.

It was previously disclosed that during the purge cycle, pumps 110 and 112 shut down. In some alternative embodiments, autonomously-controlled conditioning system 200 is appropriately piped and valved so that pumps 110 and 112 continue to operate during the purge cycle. Instead of shutting down these pumps, various control valves (not depicted) change state such that pumps 110 and 112 are no longer fluidically coupled to concentrator 104. In this changed state, the pumps cannot draw air through concentrator 104, even though they continue to operate. Meanwhile, purge pump 220 drives the purge cycle.

In the illustrative embodiment, autonomously-controlled conditioning system 200 includes purge pump 220. In some alternative embodiments, autonomously-controlled conditioning system 200 does not incorporate purge pump 220. Rather, pumps 110 and 112 are suitably piped and valved to provide the functionality of purge pump 220.

Those skilled in the art, after reading the present disclosure, will be able to design and implement a control system that is capable of cycling autonomously-controlled conditioning system 200 between normal operation and a purge cycle.

Figure 4:
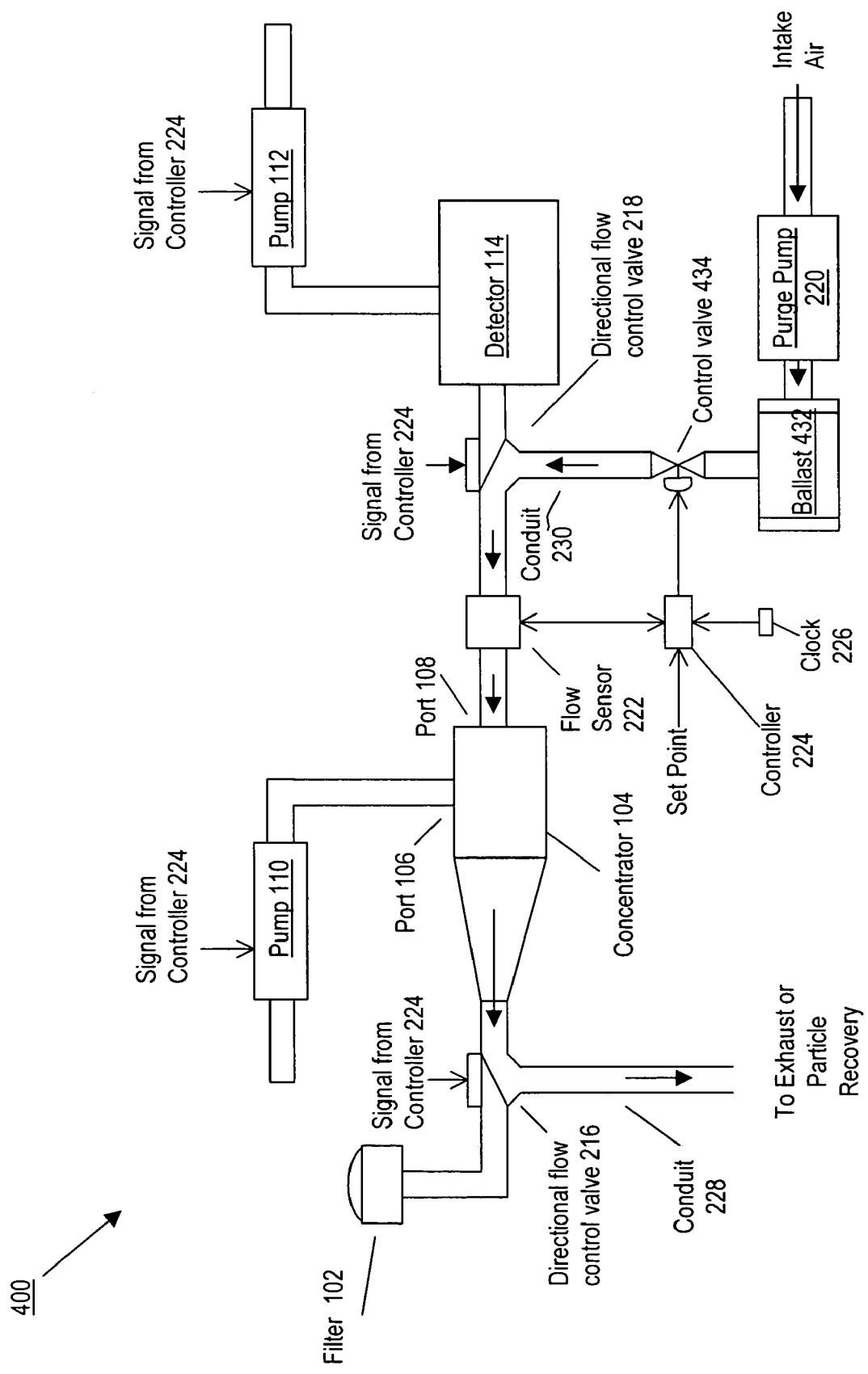
FIG. 4 depicts a first variation of the illustrative embodiment.

FIG. 4 depicts autonomously-cleaned conditioning system 400, which is a variation of autonomously-cleaned conditioning system 200. In the variation that is depicted in FIG. 4, purge pump 220 fills ballast 432 with pressurized air (e.g., about 1 liter at 60 psi) for the purge cycle. When the purge cycle initiates (either periodically or based on sensor readings, as previously described), a signal from controller 224 causes control valve 434 to quickly open. This releases the pressurized air from ballast 432, which courses through the system to dislodge clogged particles, etc. In this embodiment, control valve 216 directs purge air toward conduit 228, rather than filter 102. The operation of the other elements of system 400, including pumps 110 and 112, control valve 218, purge pump 220, flow sensor 222, controller 224, and clock 226 is the same as previously described for autonomously-cleaned conditioning system 200.

FIG. 5 depicts autonomously-cleaned conditioning system 500, which is a second variation of autonomously-cleaned conditioning system 200. In the variation depicted in FIG. 5, conduit 228 is not present and, as a consequence, upstream control valve 216 is not required. In conditioning system 500, purge flow passes through concentrator 104 as well as filter 102. The operation of the other elements of system 500, including pumps 110 and 112, control valve 218, purge-pump 220, flow sensor 222, controller 224, and clock 226 is the same as previously described for autonomously-cleaned conditioning system 200.

Autonomously-cleaned condition systems 200, 400, and 500 include both filter 102 and concentrator 104. In some other embodiments, only a filter is included in the conditioning system, while in some further embodiments, the only conditioning element present is a concentrator.

It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Furthermore, it is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

We claim:

1. An apparatus comprising:
a first conditioning element comprising a concentrator;
a second conditioning element comprising a filter;
a control system for autonomously initiating a purge cycle, wherein said control system comprises:
(a) a downstream control valve, wherein said downstream control valve is disposed downstream of said first conditioning element and is in fluidic communication with said first conditioning element; and
(b) an upstream control valve, wherein said upstream control valve:
(i) is disposed upstream of said first conditioning element;
(ii) is in fluidic communication with said first conditioning element;
(iii) has a first state wherein said upstream control valve fluidically couples said concentrator to said filter; and
(iv) has a second state wherein said upstream control valve fluidically couples said concentrator to a location for receiving particles that have been removed from said concentrator during said purge cycle; and
a purge system for conducting the purge cycle, wherein said purge system comprises a pump, wherein said pump is fluidically coupled to said first conditioning element via said downstream control valve during said purge cycle and wherein said pump is operative to force air from said pump toward said downstream control valve, wherein during said purge cycle, gas flows through said first conditioning element in a reverse direction, wherein said reverse direction is opposite to a direction of flow during normal operation.

2. The apparatus of claim 1 wherein said downstream control valve has a first state and a second state, wherein:
in said first state, said downstream control valve fluidically couples said pump to said first conditioning element; and
in said second state, said downstream control valve fluidically couples said first conditioning element to a device selected from the group consisting of a sampling device, an analysis device, and a detector.

3. The apparatus of claim 2 wherein said control system further comprises a controller, wherein said controller initiates a change in state of said downstream control valve between said first state and said second state based on time.

4. The apparatus of claim 2 wherein said control system further comprises:
- a sensor, wherein said sensor senses a change in an operating parameter of said apparatus, and wherein said sensor generates a signal that is indicative of a said change; and
- a controller, wherein said controller receives said signal from said sensor and compares said signal to a set point, and wherein based on the comparison, said controller initiates a change in state of said downstream control valve between said first state and said second state.

5. The apparatus of claim 4 wherein said sensor is selected from the group consisting of a flow sensor and a pressure sensor.

6. The apparatus of claim 1 wherein said pump is used only during operation of the purge cycle, and wherein the apparatus further comprises a second pump for drawing air through said first conditioning element during normal operation.

7. The apparatus of claim 1 wherein said pump is appropriately valved to cause air to flow through said first conditioning element during normal operation.

8. The apparatus of claim 1 wherein said purge system comprises a ballast, wherein said ballast contains pressurized air, and wherein said ballast is fluidically coupled to said first conditioning element via said downstream control valve during said purge cycle, wherein said pressurized air is released from said ballast.

9. The apparatus of claim 8, wherein said pump is fluidically coupled to said ballast.

10. An apparatus comprising:
- an inlet filter;
- a concentrator, wherein said concentrator is fluidically coupled to said inlet filter;
- a downstream control valve, wherein said downstream control valve is fluidically coupled to said concentrator;
- a pump, wherein said pump is fluidically coupled to said concentrator via said downstream control valve during a purge cycle, and wherein:
  - (a) during said purge cycle, air flows through said concentrator in a reverse direction, said reverse direction being opposite to a direction of flow during normal operation; and
  - (b) said pump is operative to force air from said pump toward said downstream control valve; and
- a control system for autonomously initiating said purge cycle, wherein said control system comprises a controller, wherein said controller generates and transmits a signal that initiates a change in state of said downstream control valve, and wherein said signal is generated based on one of the following conditions:
  - (i) a set period of time has elapsed; and
  - (ii) a change in an operating parameter of said apparatus, wherein the operating parameter is selected from the group consisting of a rate of flow of air out of the concentrator during normal operation and a pressure drop across said concentrator during normal operation.

11. The apparatus of claim 10 wherein the change in state of said downstream control valve results in said pump being coupled to said downstream control valve so that air is forced from said pump towards said downstream control valve.

12. The apparatus of claim 10 wherein said control system comprises a sensor, wherein said sensor senses the change in said operating parameter and wherein said sensor generates a signal that is indicative of said change; and further wherein said controller receives said signal from said sensor and compares said signal to a set point, and wherein based on the comparison, said controller initiates said change in state of said downstream control valve.

13. The apparatus of claim 12 wherein said sensor is selected from the group consisting of a flow sensor and a pressure sensor.

* * * * *